(12) United States Patent
Park et al.

(10) Patent No.: US 8,804,688 B2
(45) Date of Patent: Aug. 12, 2014

(54) SYSTEM AND METHOD PROVIDING VARIOUS PILOT SUB-CARRIER DENSITIES IN OFDMA COMMUNICATIONS

(75) Inventors: Sungki Park, Ashburn, VA (US); Masoud Olfat, Great Falls, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 862 days.

(21) Appl. No.: 12/539,268

(22) Filed: Aug. 11, 2009

(65) Prior Publication Data

US 2011/0038324 A1 Feb. 17, 2011

(51) Int. Cl.
*H04B 7/208* (2006.01)
*H04B 7/185* (2006.01)
*H04K 1/10* (2006.01)

(52) U.S. Cl.
USPC .......................... 370/344; 370/318; 375/260

(58) Field of Classification Search
USPC .......... 370/328–333, 343–344; 455/436–444, 455/450
See application file for complete search history.

(56) References Cited

U.S. PATENT DOCUMENTS

| | | | | |
|---|---|---|---|---|
| 7,388,920 | B2 | 6/2008 | Nam et al. | 375/260 |
| 7,697,654 | B1 * | 4/2010 | Jin et al. | 375/377 |
| 7,924,935 | B2 * | 4/2011 | Tong et al. | 375/267 |
| 7,983,350 | B1 * | 7/2011 | Dhanoa et al. | 375/260 |
| 2008/0075032 | A1 * | 3/2008 | Balachandran et al. | 370/317 |
| 2008/0165734 | A1 * | 7/2008 | Hart et al. | 370/330 |

OTHER PUBLICATIONS ("Channel Estimation Approach with Variable Pilot Density to Mitigate Interference over Time-Selective Cellular OFDM Systems"; Lee, Sungeun; Kim, Jihyung; Kwak, Kyungchul; Hong, Daesik; IEEE Transactions on Wireless Communication vol. 7 No. 7; Jul. 2008).*
Lindskog E., et al., "Modified Pilot Allocation for AMC and Optional PUSC Uplink Subchannels for STC Mode," IEEE 802.16 Broadband Wireless Access Working Group, Jun. 25, 2004.
Ahmadi, S., "Introduction to mobile WiMAX Radio Access Technology: PHY and MAC Architecture," Wireless Standards and Technology, Intel Corporation, Dec. 7, 2006.
Rüegg, A., et al., "Uplink Pilot Patterns for IEEE 802.16m," IEEE 802.16 Broadband Wireless Access Working Group, May 5, 2008.
Section 8.4.3, OFDMA basic terms definition, "Part 15: Air Interface for Broadband Wireless Access Systems," IEEE 802.16Rev2/08 Dec. 2008.
Section 8.4.6, OFDMA subcarrier allocations, "Part 15: Air Interface for Broadband Wireless Access Systems," IEEE 802.16Rev2/08 Dec. 2008.
Section 8.4.8, Space-time coding (STC) (optional), "Part 15: Air Interface for Broadband Wireless Access Systems," IEEE 802. 16Rev2/08 Dec. 2008.

* cited by examiner

*Primary Examiner* — Afshawn Towfighi

(57) ABSTRACT

A method for varying pilot sub-carrier density in OFDMA communications is described. The method comprises calculating channel quality from sub-carriers; determining whether the channel quality is outside a threshold range; selecting a different pilot sub-carrier density for a sub-zone based on the value of the channel quality when the channel quality is outside the threshold range; and setting the sub-zone to the different pilot sub-carrier density. A system for using sub-zones with different pilot sub-carrier densities in OFDMA communications is also described.

29 Claims, 8 Drawing Sheets

| OFDMA Parameters Used in WiMAX for DL PUSC configuration | | | | |
|---|---|---|---|---|
| Parameter | Values | | | |
| Channel Bandwidth (MHz) | 1.25 | 5 | 10 | 20 |
| FFT Size | 128 | 512 | 1,024 | 2,048 |
| Number of data sub-carriers | 72 | 360 | 720 | 1,440 |
| Number of pilot sub-carriers | 12 | 60 | 120 | 240 |
| Number of DC/guard sub-carriers | 44 | 92 | 184 | 368 |
| Sub-carrier frequency spacing (kHz) | 10.94 | 10.94 | 10.94 | 10.94 |

SYSTEM AND METHOD PROVIDING VARIOUS PILOT SUB-CARRIER DENSITIES IN OFDMA COMMUNICATIONS

FIELD OF THE INVENTION

The teachings herein relate generally to cellular telephone communications, and more particularly to a system and method for allowing variation in pilot sub-carrier density to improve channel estimation for Orthogonal Frequency Division Multiple Access (OFDMA) communications.

SUMMARY OF THE INVENTION

One aspect of the invention is directed to a method for varying pilot sub-carrier density in OFDMA communications. The method can include calculating channel quality from sub-carriers; determining whether the channel quality is outside a threshold range; and selecting a different pilot sub-carrier density for a sub-zone based on the value of the channel quality when the channel quality is outside the threshold range; and setting the sub-zone to the different pilot sub-carrier density.

Another aspect of the invention is directed to a system for varying pilot sub-carrier density in OFDMA communications. The system can include a channel quality calculator to calculate channel quality based on sub-carriers; a determiner to determine whether the channel quality is outside a threshold range; a selector to select a different pilot sub-carrier density for a sub-zone based on the value of the channel quality when the channel quality is outside the threshold range, and a scheduler to set the sub-zone to the different pilot sub-carrier density.

Yet another aspect of the invention is directed to a computer readable medium in which software is recorded, wherein the software is configured to implement a method for varying pilot sub-carrier density in OFDMA communications. The implementation of the method in software can include calculating channel quality from sub-carriers; determining whether the channel quality is outside a threshold; selecting a different pilot sub-carrier density for a sub-zone based on the value of the channel quality when the channel quality is outside the threshold; and setting the sub-zone to the different pilot sub-carrier density.

BRIEF DESCRIPTION OF THE DRAWINGS

The foregoing and other objects, aspects, and advantages are better understood from the following detailed description of a preferred embodiment of the invention with reference to the drawings, in which.

DETAILED DESCRIPTION OF THE INVENTION

The current WiMAX standard is less efficient for channel estimation in situations where the mobile is in a bad or challenging channel environment because there is only one pilot sub-carrier density available, for instance in a Down-Link (DL) zone configuration or an Up-Link (UL) zone configuration. Further, the location and number of the pilot sub-carriers can have an impact on channel estimation performance. As such, when using a standard communication protocol and a bad or challenging channel environment arises, the inability to change pilot sub-carrier density may cause a large channel estimation error to occur. For instance, where Space-Time Coding (STC) transmission is being used with 2-antennas in Down-Link Partial Usage of Sub-channels (PUSC), it is observed that the pilot sub-carrier density available per the standard is not sufficient to avoid a large channel estimation error in a situation where the channel environment is very challenging. A large channel estimation error can cause the effective bandwidth capacity or the throughput of the system to degrade. By varying the pilot sub-carrier density, the channel estimation error can be reduced. Further, based on a calculated channel quality of the channel environment, a pilot sub-carrier density can be chosen to minimize the channel estimation error (or mean squared error of the channel estimation error, actual or predicted) between a desired range. The calculation of channel estimation error for OFDMA is well known in the art.

OFDMA is a form of wireless communication that provides for signaling and multiple user access on both the UL and DL channels. OFDMA also is a telecommunications technology that employs a number of advanced wireless techniques to provide efficient and robust communications. For example, OFDMA uses a frequency-division multiplexing scheme utilizing a large number of closely spaced orthogonal sub-carriers to carry data. OFDMA also uses FFT to efficiently build a single high data rate signal from the combination of the sub-carriers in parallel. One implementation of OFDMA is known as WiMAX and is based on the IEEE 802.16Rev2/D8 standard available from IEEE, which is incorporated herein by reference in its entirety. Other implementations of OFDMA include, for example, fixed WiMAX and Long Term Evolution (LTE).

An OFDMA symbol is made up of sub-carriers. There are several types of sub-carriers:
 Pilot: used for various channel estimation purposes;
 Data: used for data transmission; and Null: used for no transmission at all, for guard bands, and for a DC component.

Figures 1, 2:
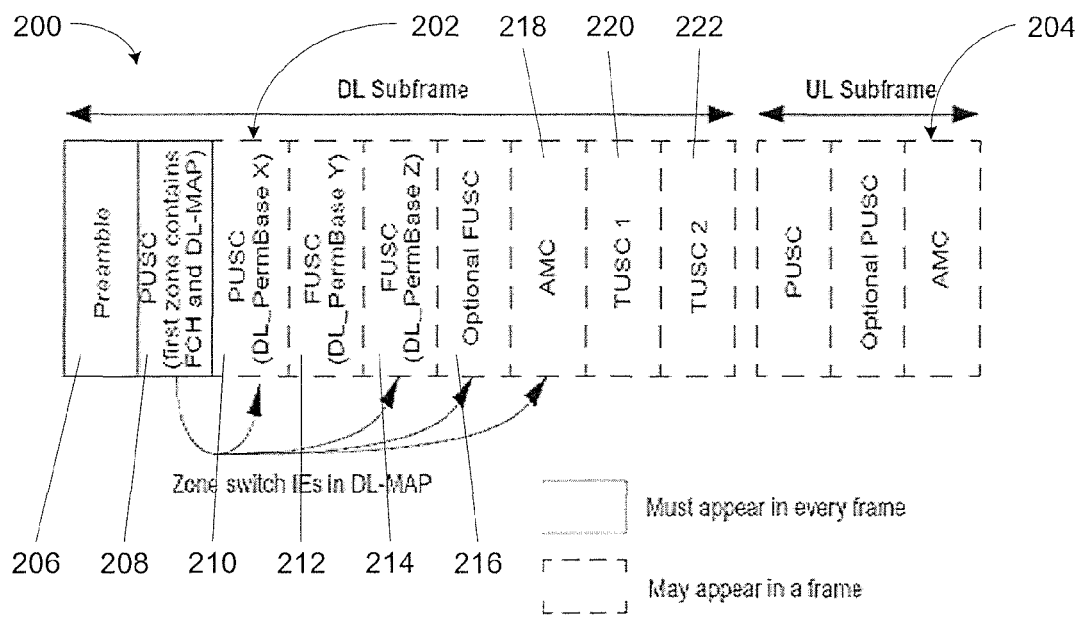
FIG. 1 is a table listing various Fast Fourier Transform (FFT) size-related parameters for Worldwide Interoperability for Microwave Access (WiMAX)
FIG. 2 illustrates a frame structure for Time-Division Duplex (TDD) communications for WiMAX.

The bandwidth of the OFDMA signal can be used to determine the FFT size. For example, as shown in FIG. 1, WiMAX specifies the use of an FFT size of 128, 512, 1024, or 2048, respectively, when using an OFDMA signal of 1.25 MHz, 5 MHz, 10 MHz, or 20 MHz bandwidth. The FFT size can then determine the number of sub-carriers. For instance, a 1024-size FFT can have 1024 sub-carriers, as the number of sub-carriers is generally equal to the size of the FFT. Depending on the purpose of the OFDMA symbol, e.g., preamble, sync, or data, the size of the FFT also determines the value and location of the sub-carriers in the spectrum associated with the FFT. Thus, as shown in the table of FIG. 1, for a 1024-size FFT WiMAX specifies that an OFDMA data symbol for DL PUSC can have 1 DC sub-carrier, 183 guard band sub-carriers, 120 pilot sub-carriers, and 720 data sub-carriers.

In OFDMA multi-user access occurs when each user is assigned a subset of the available data sub-carriers to communicate with. In order to transmit meaningful arrangements of OFDMA symbols over time, WiMAX uses a frame structure appropriate to Time-Division Duplex (TDD), full-duplex Frequency-Division Duplex (FDD), or half-duplex Frequency-Division Duplex (HFDD or HD-FDD) communications.

FIG. 2 illustrates such a frame structure for the more commonly-used TDD communications in WiMAX. The TDD WiMAX frame 200 structure consists of a DL sub-frame 202 and a UL sub-frame 204. In some embodiments such as Multiple-In and Multiple-Out (MIMO), a DL sub-frame 202 and a UL sub-frame 204 can be transmitted at the same time by two or more transmitters. In the same or alternative embodiments, a DL sub-frame 202 and a UL sub-frame 204 can also be received at the same time by two or more receivers. A UL or DL sub-frame can be separated from another UL or DL sub-frame by either a transmit-receive transition gap (TTG) (not shown) or a receiver-transmit transition gap (RTG) (not shown). DL sub-frame 202 generally begins with a preamble 206, followed by a plurality of zones. A zone is a grouping of contiguous symbols that use a specific type of sub-channel assignment. For example, WiMAX specifies at least seven such zones for a sub-frame. DL sub-frame 202 can comprise a first PUSC 208 zone, one or more optional PUSC 210 zones; one or more Full Usage of Sub-Channels (FUSC) 212, 214 zones; one or more Optional FUSC (OFUSC) 216 zones; one or more Adaptive Modulation and Coding (AMC) 218 zones; and one or more Tile Usage of Sub-Channels 220, 222 (TUSC1 and TUSC2) zones. Similarly, UL sub-frame 204 can comprise one or more of the zones described above. Of the different zones, PUSC is the most commonly used zone in WiMAX systems. With the exception of first DL PUSC 208 zone, which is assigned after DL preamble 206, all of the zones described can be disposed in any order within a sub-frame.

The manner in which the data sub-carriers are assigned can depend upon the zone structure. For example, the PUSC, FUSC, or AMC zones can be assigned different sub-carriers and can utilize a different pilot sub-carrier density. A pilot sub-carrier density can be specified by a sub-carrier specification structure, such as a cluster structure, a tile structure, or a zone structure. For DL PUSC, the smallest grouping of sub-carriers is called a cluster. Cluster structure 300 of FIG. 3, can define a cluster, for example, as 14 sub-carriers within an OFDMA symbol, wherein the sub-carriers are counted from left to right in order of increasing sub-carrier index. Each cluster can comprise one or more of a pilot sub-carrier 306, data sub-carrier 308, or null sub-carrier (not shown). In one embodiment, the sub-carriers comprising the cluster can be chosen from physically non-adjacent sub-carriers. In other embodiments, the sub-carriers comprising the cluster can be chosen from physically adjacent sub-carriers. Generally, the null sub-carrier is not part of the cluster.

Figure 3:
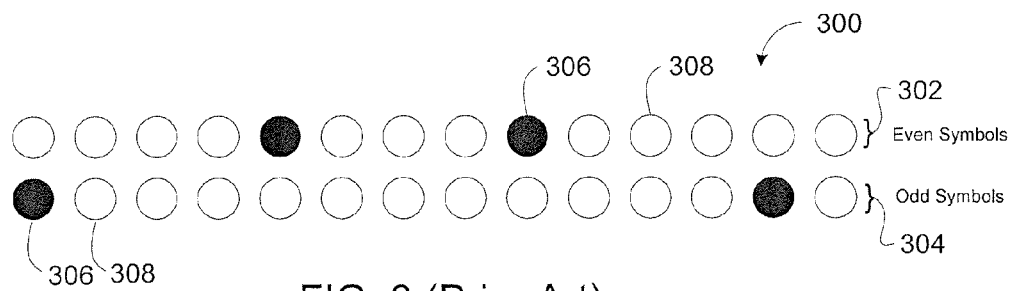
FIG. 3 illustrates an embodiment of a sub-carrier specification structure comprising two pilot sub-carriers per symbol.

To specify the location of one or more of a pilot sub-carrier 306, the OFDMA symbols transmitted must be counted. For the purpose of determining DL PUSC pilot sub-carrier location, odd and even symbols can be counted from the beginning of the current zone with the first symbol of the zone being an even symbol. The location(s) of pilot sub-carrier(s) 306 in a cluster can be preset by a sub-carrier specification structure. For example, WiMAX defines a cluster structure 300 that specifies a default pilot sub-carrier density and default locations of the two pilot sub-carriers 306 depending on whether the count is an even symbol 302 or odd symbol 304. As illustrated in FIG. 3, for an even symbol 302 the locations of pilot sub-carriers 306 in the cluster are specified at sub-carrier indexes 4 and 8. For an odd symbol 304 the locations of pilot sub-carriers 306 in the cluster are specified at sub-carrier indexes 0 and 12. Once the pilot sub-carrier 306 locations are specified by cluster structure 300 for an even symbol 302 or odd symbol 304, the remaining locations in the cluster are used for data sub-carriers 308, unless it is desired to use a portion of the locations for null sub-carriers.

In order to create sub-channels when using a DL PUSC, the default WiMAX DL PUSC scheme for sub-carrier allocation to sub-channels can be performed as follows:

The sub-carriers, excluding DC and Guard sub-carriers, can be divided into physical clusters containing 14 sub-carriers each. The total number of clusters can vary with the FFT size. With a 1024-size FFT, for instance, the 840 available sub-carriers can be divided into 60 clusters, each consisting of 12 data sub-carriers and 2 pilot sub-carriers per symbol.

The physical clusters are renumbered into logical clusters. The renumbering uses permutation to generally maximize the distance in frequency between logical clusters.

The logical clusters are separated into groups based on FFT size. For example, in a 1024-size FFT the 60 logical clusters are distributed into three groups consisting of 12 logical clusters each and another three groups of 8 logical clusters each.

The data sub-carriers in each group are assigned to sub-channels based on FFT size. Since WiMAX specifies in DL PUSC that there are only 24 data sub-carriers in each symbol per sub-channel, each sub-channel requires the equivalent of two clusters for each symbol. Thus, for a 1024-size FFT, a group of 12 logical clusters will contain 6 sub-channels. For the same size FFT, a group of 8 logical clusters will contain 4 sub-channels.

Within the groups of logical clusters, the sub-channels are generally distributed using permutations across all the sub-carriers comprising the logical clusters of the group. For instance, for a 1024-size FFT, each sub-channel can be generally assigned two sub-carriers from each logical cluster in its assigned group for every symbol.

Figure 4:
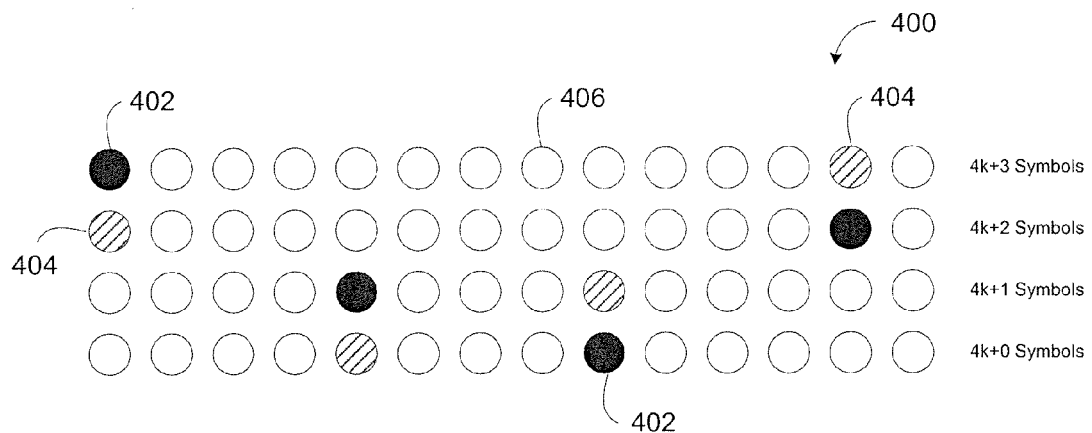
FIG. 4 illustrates an embodiment of a sub-carrier specification structure comprising two pilot sub-carriers per symbol for two antennas.

FIG. 4 is an illustration of a cluster structure 400 for a two-antenna OFDMA communications system, for example, a WiMAX system. Cluster structure 400 defines the cluster as 14 sub-carriers within an OFDMA symbol. For the purpose of determining PUSC pilot sub-carrier location, symbols can be counted from the beginning of the current zone in sets of four using the formula 4k+0, 4k+1, 4k+2, or 4k+3 as shown in FIG. 4. Based on the symbol count, cluster structure 400 specifies a default pilot sub-carrier density and default locations of pilot sub-carriers 402 for the cluster transmitted by antenna 0, and a default pilot sub-carrier density and default locations of pilot sub-carriers 404 for the cluster transmitted by an antenna 1. Once the locations of pilot sub-carriers 402, 404 are specified by cluster structure 400 for a given symbol, the remaining locations in the clusters transmitted by antennas 0, 1 are generally used for data sub-carriers 406.

Figure 5:
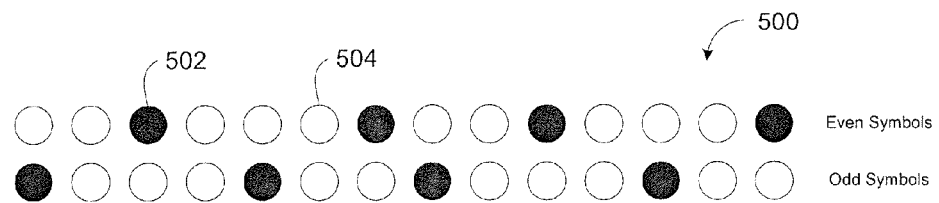
FIG. 5 illustrates an embodiment of a sub-carrier specification structure comprising four pilot sub-carriers per symbol.
Figure 6:
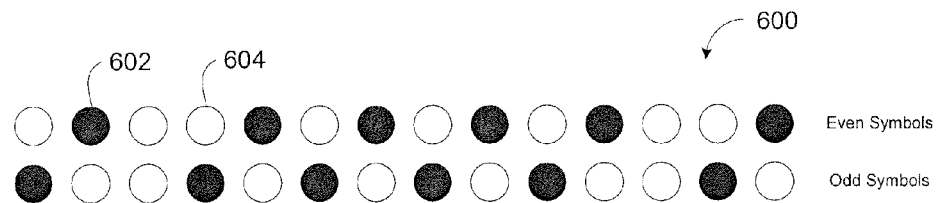
FIG. 6 illustrates an embodiment of a sub-carrier specification structure comprising six pilot sub-carriers per symbol.
Figure 7:
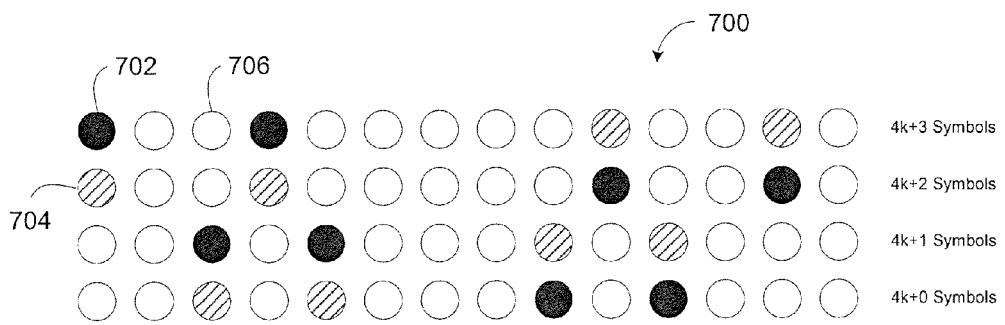
FIG. 7 illustrates an embodiment of a sub-carrier specification structure comprising four pilot sub-carriers per symbol for two antennas.

Additional pilot sub-carrier locations can be disposed in a sub-carrier specification structure. In a preferred embodiment, additional pilot sub-carrier locations can be disposed as far away as possible from existing pilot sub-carrier locations for each antenna. For example, a cluster structure could maximize $|PSI_{new} - PSI_e|$ for each antenna where $PSI_{new}$ is the Pilot Sub-carrier Index for new pilot sub-carrier locations and $PSI_e$ is the Pilot Sub-Carrier Index for existing pilot sub-carrier locations. FIGS. 5-7 are examples of different cluster structures where more pilot sub-carrier locations are added for better channel estimation performance.

FIG. 5 is an illustration of a cluster structure 500 that defines the cluster as 14 sub-carriers within an OFDMA symbol. Cluster structure 500 can reference or include a sub-carrier specification structure for providing a pilot sub-carrier density of 4 pilot sub-carriers 502 per 14 sub-carriers (i.e., 2/7 or roughly 0.286), and their locations depending on whether the count is an even or odd symbol, with the remaining locations used for 10 data or null sub-carriers 504. Cluster structure 500 also maximizes $|PSI_{new} - PSI_e|$. Cluster structure 500 defines a cluster containing 14 sub-carriers, of which for a given symbol count there are 4 pilot sub-carriers locations and 10 data or null sub-carriers locations. Thus, for a given symbol, whereas the WiMAX cluster structure 300 of FIG. 3 has a pilot sub-carrier density of 1/7 (roughly, 0.143), while the exemplary cluster structure 500 of FIG. 5 has a pilot sub-carrier density of 2/7 (roughly 0.286). As a result of cluster structure 500's higher pilot sub-carrier density, a cluster generated using cluster structure 500 will be able to offer superior channel estimation and equalization performance compared to a cluster generated using cluster structure 300, but only at a cost of lower data capacity per cluster.

Figure 9:
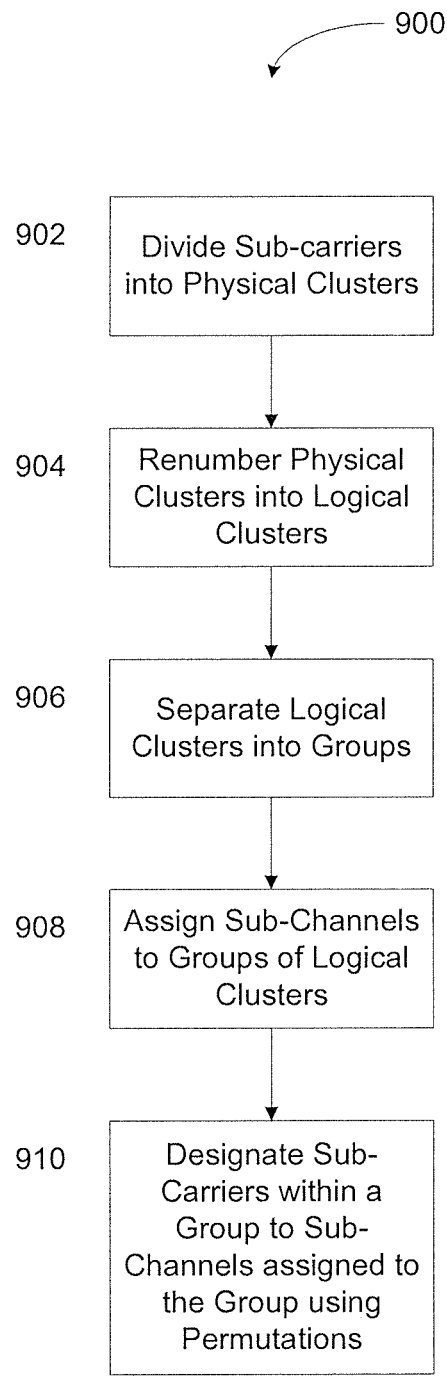
FIG. 9 illustrates an embodiment of a method for allocating sub-carriers to sub-channels.

In addition to defining a different sub-carrier specification structure for each zone structure, the sub-zone may require an alteration in the method of allocating sub-carriers to sub-channels. For instance, for a 1024-size FFT, the allocation of sub-carriers to sub-channels may be preformed using process 900 (as shown in FIG. 9) for a sub-zone assigned to use cluster structure 500:

Per step 902, the sub-carriers, excluding DC and Guard sub-carriers, are divided into physical clusters containing 14 sub-carriers each. With a 1024-size FFT, for instance, the 840 available sub-carriers may be divided into 60 clusters, each consisting of 10 data sub-carriers and 4 pilot sub-carriers per symbol.

Then, per step 904, physical clusters are renumbered into logical clusters. The renumbering uses permutation to generally maximize the distance in frequency between logical clusters.

Then, per step 906, the logical clusters are separated into groups. For a 1024-size FFT the 60 logical clusters may be distributed into 5 groups consisting of 12 logical clusters each.

Then, per step 908, the data sub-carriers in each group are assigned to sub-channels. If there are only 24 data sub-carriers in each symbol per sub-channel, each sub-channel requires the equivalent of 2.4 clusters for each symbol. Thus, for a 1024-size FFT, a group of 12 logical clusters will contain 5 sub-channels.

Then, per step 910, the sub-channels are generally distributed using permutations across all the sub-carriers comprising the logical clusters within the group. Thus, for a 1024-size FFT, each sub-channel can be generally assigned two sub-carriers from each logical cluster in its assigned group for every symbol.

FIG. 6 is an illustration of cluster structure 600 that defines the cluster as 14 sub-carriers within an OFDMA symbol. Cluster structure 600 can reference or include the sub-carrier specification structure for providing a pilot sub-carrier density of 6 pilot sub-carriers 602 per 14 sub-carriers (i.e., 3/7 or roughly 0.429) and their locations depending on whether the count is an even or odd symbol, with the remaining locations used for 8 data or null sub-carriers 604. Cluster structure 600 also maximizes $|PSI_{new} - PSI_e|$. Cluster structure 600 defines a cluster containing 14 sub-carriers, of which for a given symbol count there are 6 pilot sub-carriers locations and 8 data or null sub-carriers locations. As a result of cluster structure 600's higher pilot sub-carrier density, a cluster generated using cluster structure 600 will be able to offer superior channel estimation and equalization performance compared to any cluster generated using cluster structures 300 or 500, but only at a cost of even lower data capacity per cluster. For a sub-zone assigned to use cluster structure 600, the sub-carrier allocation to sub-channels may be performed using process 900 of FIG. 9:

Per step 902, the sub-carriers, excluding DC and Guard sub-carriers, are divided into physical clusters containing 14 sub-carriers each. The total number of clusters varies with the FFT size. With a 1024-size FFT, for instance, the 840 available sub-carriers may be divided into 60 clusters, each consisting of 8 data sub-carriers and 6 pilot sub-carriers per symbol.

Then, per step 904, the physical clusters are renumbered into logical clusters. The renumbering uses permutation to generally maximize the distance in frequency between logical clusters.

Then, per step 906, the logical clusters are separated into groups. For a 1024-size FFT the 60 logical clusters may be distributed into 5 groups consisting of 12 logical clusters each.

Then, per step 908, the data sub-carriers in each group are assigned to sub-channels. If there are only 24 data sub-carriers in each symbol per sub-channel, each sub-channel requires the equivalent of 3 clusters. Thus, for a 1024-size FFT, a group of 12 logical clusters will contain 4 sub-channels.

Then, per step 910, the sub-channels are generally distributed using permutations across all the sub-carriers comprising the logical clusters within the group. Thus, for a 1024-size FFT, each sub-channel can be generally assigned two sub-carriers from each logical cluster in its assigned group for every symbol.

FIG. 7 is an illustration of a cluster structure 700 for a two-antenna OFDMA communications system, for example, a WiMAX system. Cluster structure 700 defines the cluster as 14 sub-carriers within an OFDMA symbol comprising 4-pilot sub-carriers per symbol. For the purpose of determining pilot sub-carrier location, for example in a PUSC, symbols can be counted from the beginning of the current zone in sets of four using the formula 4k+0, 4k+1, 4k+2, or 4k+3 as shown in FIG. 7. Based on the symbol count, cluster structure 700 can reference or include a sub-carrier specification structure providing the pilot sub-carrier density and locations of pilot sub-carriers 702 and 704 for the cluster transmitted by antennas 0 and 1, respectively. Once the pilot sub-carrier density and locations of pilot sub-carriers 402, 404 are specified by cluster structure 700 for a given symbol, the remaining locations in the clusters transmitted on antennas 0, 1 are generally used for data sub-carriers 706.

In addition to the zone configurations provided by the various standards, e.g., the WiMAX standard, a zone is further comprised of one or more sub-zones. Each zone includes one reference sub-zone containing the original cluster structure specified by the WiMAX zone configuration. Each zone can also contain one or more sub-zones, each with a different sub-carrier specification structure, to allow for varying pilot sub-carrier densities between sub-zones. A DL MAP or UL MAP can also comprise a zone switch Information Element (IE), with the IE providing management information for the frame it is embedded in. A DL MAP IE or UL MAP IE can comprise information about a sub-carrier specification structure to be used for a zone within the frame. The DL MAP IE or UL MAP IE can comprise a sub-carrier specification structure, or a sub-carrier specification structure identifier that identifies a sub-carrier specification structure, for example, by a unique identifier.

In a similar manner to DL PUSC, sub-carrier specification structures for sub-zones may be defined for the FUSC, AMC, OPUSC, OFUSC, TUSC1, and TUSC2 zones. For zones that use a cluster or tile structure, variations in pilot sub-carrier density of the cluster or tile structure can be achieved by using various sub-carrier specification structures shown here for DL PUSC or UL PUSC. For zone configurations that do not use cluster or tile structures, variations in pilot sub-carrier density of the zone structure(s) can be implemented by increasing or decreasing the number of pilot sub-carrier locations in an OFDMA symbol. As such, sub-zones for any zone configuration can be specified, each of which can be assigned a sub-carrier specification structure, for example, a cluster structure, tile structure, or other zone structures, for varying pilot sub-carrier density.

Figure 8:
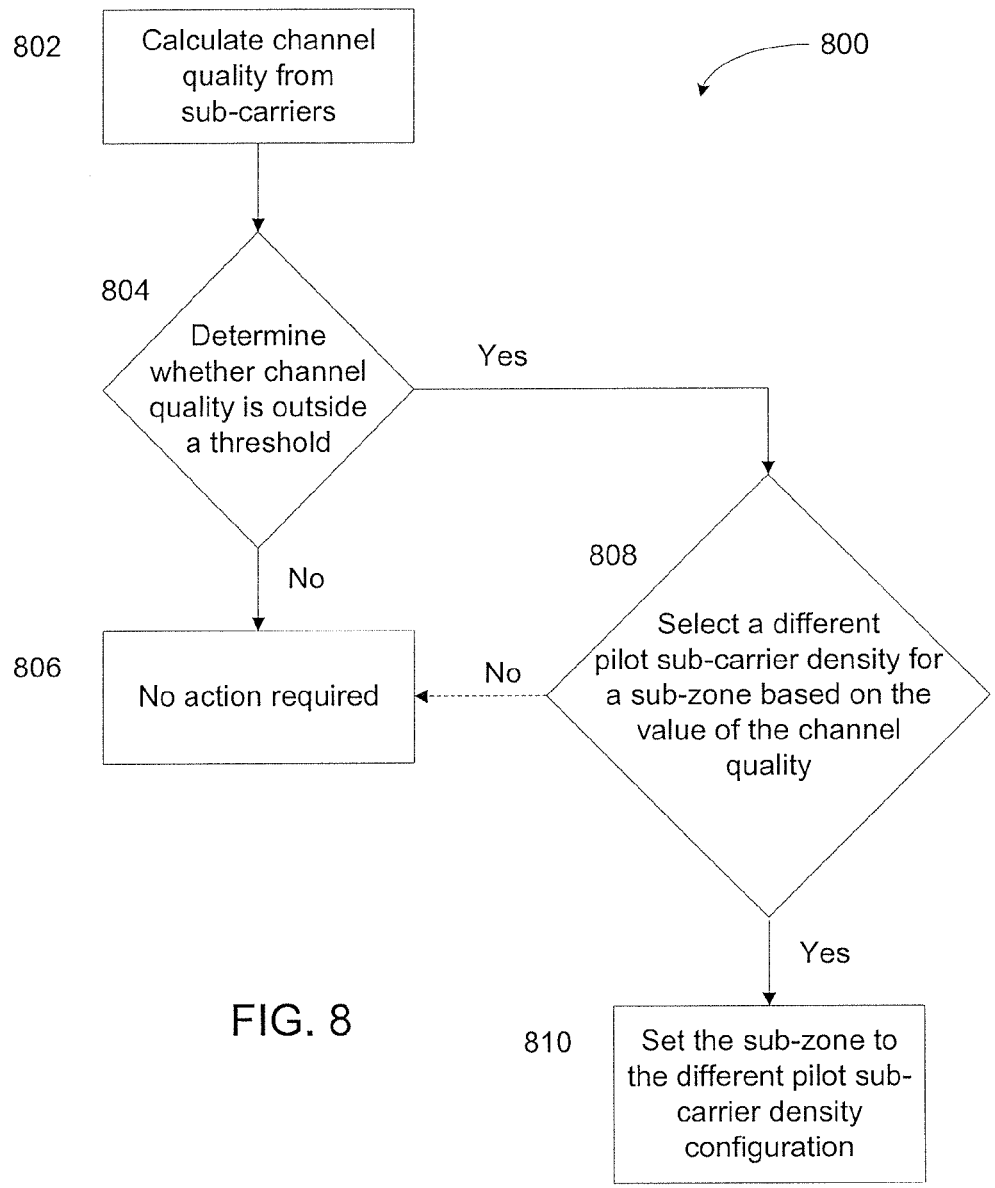
FIG. 8 illustrates an embodiment of a method for varying pilot sub-carrier density.

FIG. 8 illustrates a process 800 for determining that a sub-zone switch is required. In step 802, a channel quality or estimation determination is made from sub-carrier information (e.g., standard deviation of PCINR is high, channel correlation is high, rank is low, etc), for example, via feedback channel messaging. In the preferred embodiment, the channel quality or estimation determination is made from pilot sub-carrier information. Alternatively or additionally, the channel quality or estimation determination can be made from other sub-carrier information (e.g., preamble sub-carrier information). In step 804, a determination whether channel quality or estimation is challenging, i.e., above or below one or more thresholds, is made. If the channel condition is not challenging, no further action is required per step 806. If, however, the channel condition is challenging, a module such as base station (BS) scheduler selects in step 808 a sub-carrier specification structure with a different pilot sub-carrier density for a sub-zone based on the value of the channel quality. In some embodiments, the sub-carrier specification structure with a different pilot sub-carrier density selected for a sub-zone will have a lower pilot sub-carrier density than the pilot sub-carrier density of the current sub-carrier specification structure being used by the sub-zone.

In some embodiments, selecting a sub-carrier specification structure with a different pilot sub-carrier density is not always feasible or beneficial. Thus, in some embodiments, the selection undertaken in step 808 can check if setting the sub-zone to the different pilot sub-carrier density is permitted (as shown by the dashed line between step 808 and step 806 in FIG. 8). In some embodiments, selecting a sub-carrier specification structure with a different pilot sub-carrier density for a sub-zone may not be permitted when a sub-zone set to a sub-carrier specification structure with a different pilot sub-carrier density may not be feasible due to system capabilities, load, etc. Thus, in some embodiments, checking if selecting a sub-carrier specification structure with a different pilot sub-carrier density for a sub-zone is permitted can take into account the affect on a total system, or a portion thereof, prior to allowing step 810 to proceed. If varying the pilot sub-carrier density will have a negative impact on total system performance, or a portion thereof, the change in pilot sub-carrier density may not be effectuated. In alternative or additional embodiments, checking if selecting a sub-carrier specification structure with a different pilot sub-carrier density for a sub-zone is permitted can take into account whether a base station and a mobile station are adapted to implement the sub-zone to the different pilot sub-carrier density. If the base station or mobile station is not adapted to implement the sub-zone to the different pilot sub-carrier density, the change in pilot sub-carrier density may not be effectuated.

In some embodiments, if selecting a sub-carrier specification structure with a different pilot sub-carrier density for a sub-zone is not permitted, no further action is required per step 806. Otherwise, in step 810, for the communications in the frame to be transmitted a module such as base station (BS) scheduler sets the sub-zone to a sub-carrier specification structure with a different pilot sub-carrier density.

A BS can arrange for a mobile station (MS) to utilize one of various sub-zones within a zone. For instance, a BS may determine that the PCINR of a MS is below a certain threshold and instruct the MS to use a sub-zone using cluster structure 500 instead of a default sub-zone using cluster structure 300. If this is still insufficient to establish acceptable channel estimation and equalization performance for the MS, the BS may instruct the MS to use a sub-zone using cluster structure 600. Alternatively, the BS may also determine that the PCINR is so low below a specified threshold that it will instruct the MS to switch to a sub-zone using cluster structure 600 from a sub-zone using cluster structure 300, even if there is a sub-zone available using cluster structure 500.

It is to be understood that there are a number of different measures that a BS may receive from a MS to evaluate channel quality. Based on an evaluation of these parameters against a threshold or other analysis (e.g., size of statistical variation), the MS can calculate a value for the channel quality, and request or instruct the BS to switch to any other available sub-zones in one embodiment. Alternatively or additionally, the BS may instruct or request the MS to switch incrementally between available sub-zones based on the pilot sub-carrier density of each sub-zone.

A determination that a sub-zone switch is required for a MS could be triggered either by a MS, by a BS, or by a hybrid method. In one embodiment, the sub-zone switching is triggered by a MS. The MS detects its channel condition is challenging, and sends a BS a recommendation to switch to a sub-zone. The BS accepts the MS recommendation, and switches the MS to a sub-zone. In another embodiment, the switching could be triggered by a BS. The BS detects that the MS channel condition, for example, via feedback channel messaging, is challenging (e.g., standard deviation of PCINR is high, channel correlation is high, rank is low, etc.), and switches the MS to a different sub-zone. In another embodiment, the switching could be triggered by a hybrid method. The BS receives a MS recommendation and the BS also detects the MS channel condition, the BS then compares the MS recommendation with an evaluation of the MS channel condition, and makes a final decision.

The sub-zone switch is communicated and implemented between the BS and MS. In a preferred embodiment, the switch is compatible with a standard, e.g., the WiMAX standard. For example, there is a zone switch information element (IE) in DL-MAP or UL-MAP disposed in the first PUSC 210 in WiMAX. Similarly, an OFDMA DL STC Zone IE or OFDMA UL Zone IE could be extended for other standards. A zone switch IE can be used by the BS to switch to a different sub-carrier specification structure for a sub-zone.

Figure 10:
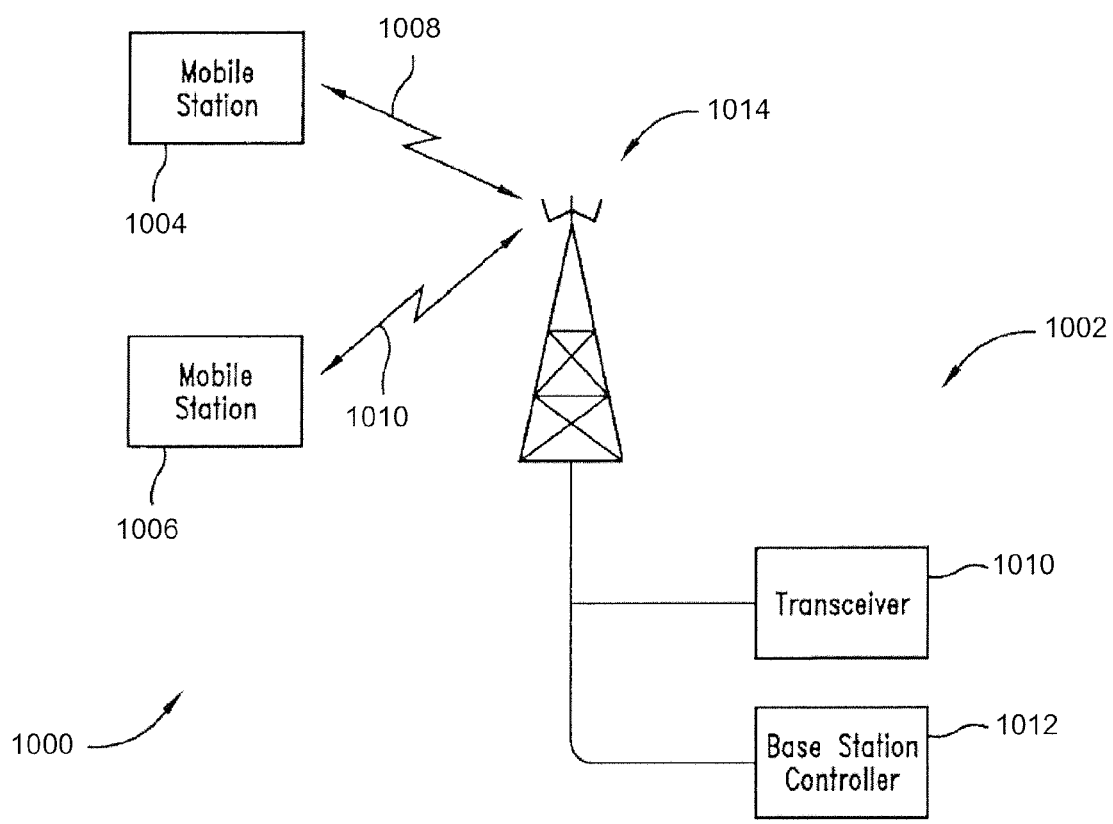
FIG. 10 illustrates a diagram for a wireless communication system constructed in accordance with the present disclosure.

FIG. 10 illustrates an embodiment of a system 1000 constructed in accordance with the present disclosure. A BS 1002 communicates with a MS 1004 and a MS 1006 over wireless communication links 1008 and 1010, respectively. Although referred to herein as "Mobile Stations," those skilled in the art will appreciate that a user can be in a fixed location, such as a home or office, and communicate with the BS 1002 without physically changing location. The present disclosure is not limited to a MS that is actually moving.

The BS 1002 comprises a transceiver 1010 and a base station controller (BSC) 1012. In an exemplary embodiment, the transceiver 1010 is an OFDM transceiver. The transceiver 1010 maybe implemented as a separate transmitter and receiver. The BSC 1012 controls operation of the BS 1002 and, among other operations, selects the operational frequency and transmit power of the transceiver 1010.

The BS 1002 also has an antenna system 1014. As those skilled in the art will appreciate, the BS 1002 has a range of coverage that is typically divided into a plurality of sectors (e.g., three sectors). The antenna system 1014 includes antenna elements that provide coverage for each of the plurality of sectors. The BS 1002 may include a separate transceiver 1010 for each sector. The multiple transceivers 1010 may be controlled by a single BSC 1012. The condensed frequency reuse implemented by the BS 1002 is described above. That is, the transceivers 1010 are programmed for operation using the condensed frequency reuse scheme described above. Operational details of the BS 1002 are known in the art and need not be described in greater detail herein.

A cellular network typically includes a plurality of base stations constructed in accordance with the BS 102. Exemplary embodiments of cellular networks including base stations configured to implement the teachings are provided herein. ps Exemplary Embodiment For WiMAX implementations, the teachings reference the following sections in the IEEE 802.16Rev2/D8 standard:
Section 8.4.3.3 which describes the permutation zones.
Section 8.4.3.4 which describes OFDMA data mapping.
Section 8.4.4 which describes the TDD frame structure.
Section 8.4.6.1 which describes the DL transmission structure.
Section 8.4.6.1.2.1.1 which describes the DL sub-channels sub-carrier allocation in PUSC.
Section 8.4.6.2 which describes the UL transmission and symbol structure.
Specifically, section 8.4.6.2.1 which describes the symbol structure for sub-channel in PUSC and describes the concept of the UL tile.
Section 8.4.8.1.2.1.1 which describes STC using 2 antennas in PUSC.
Section 8.4.8.1.5 which describes the UL using STC The cluster structure for DL and the tile structure for UL can be altered to promote efficient channel estimation. As noted previously, if the MS is in a good channel environment, then the existing cluster definition described in the 802.16Rev2/D8 standard may be applied. If the MS is in a bad (challenging) channel environment, the teachings provide the MS the opportunity to have more pilot sub-carriers with different pilot sub-carrier locations. A BS scheduler may assign the MS to the appropriate sub-zone of STC PUSC and apply the altered cluster structure for DL and tile structure for UL.

For the DL link, cluster structures can be defined as Cluster Type Set—{CT1, CT2 ... CTn}, where CT1 could be defined as per the standard as in reference Section 8.4.8.1.2.1.1 on the DL.

Variations of CT1 could be defined to include more pilot sub-carriers and placing the pilot sub-carriers in different locations within the cluster structures.

In such a fashion, a certain number of cluster type sets could be generated.

Within the data portion of the frame, i.e., within the STC PUSC zone, several sub-zones are defined. If a cluster type is pre-defined for each sub-zone as shown in FIG. 11A, then depending on the channel environment the MS could be allocated to a particular sub-zone that would be most pertinent for efficient channel estimation to take place.

Figure 11A:
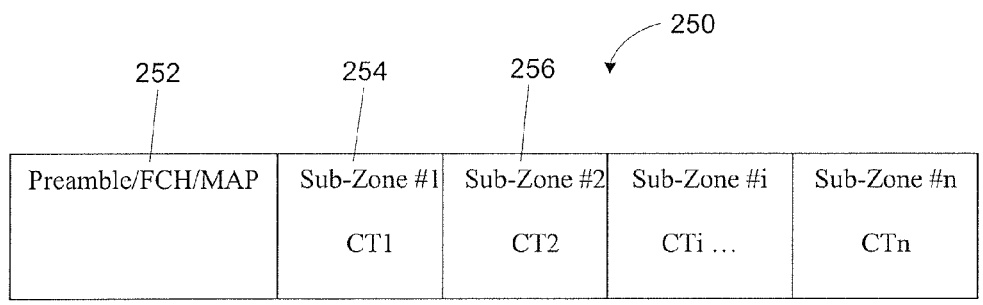
FIG. 11A illustrates an embodiment of a sub-zone allocation in a downlink sub-frame where each sub-zone in the sub-frame can have a different pilot sub-carrier density.

For example, in FIG. 11A, sub-frame 250 includes a preamble 252, a Sub-zone #1 254 using a cluster structure CT1 (Cluster Type 1), a Sub-zone #2 256 using a cluster structure CT2 (Cluster Type 2) etc. For example, if a MS is in a good channel environment its bursts would be allocated to Sub-zone #1 that is associated with CT1, which is as defined in the WiMAX standard as a normal cluster structure. In the event the MS is in a bad (challenging) channel environment, the MS can be allocated to Sub-zone #i (for example only), which is associated with cluster structure CTi (Cluster Type i). CTi can include a greater number of pilot sub-carriers spaced out using a pre-defined method. BS scheduler can configure Cluster Type Set={CT1, CT2 ... CTn} and allocate each CT (cluster type) on each STC PUSC sub-zone based on channel feedback information from a MS, e.g., PCINR, ACI(/NACK, correlation, Rank, etc. The MS can be provisioned or made aware of pre-defined CTs via DL/UL MAP.

Figure 11B:
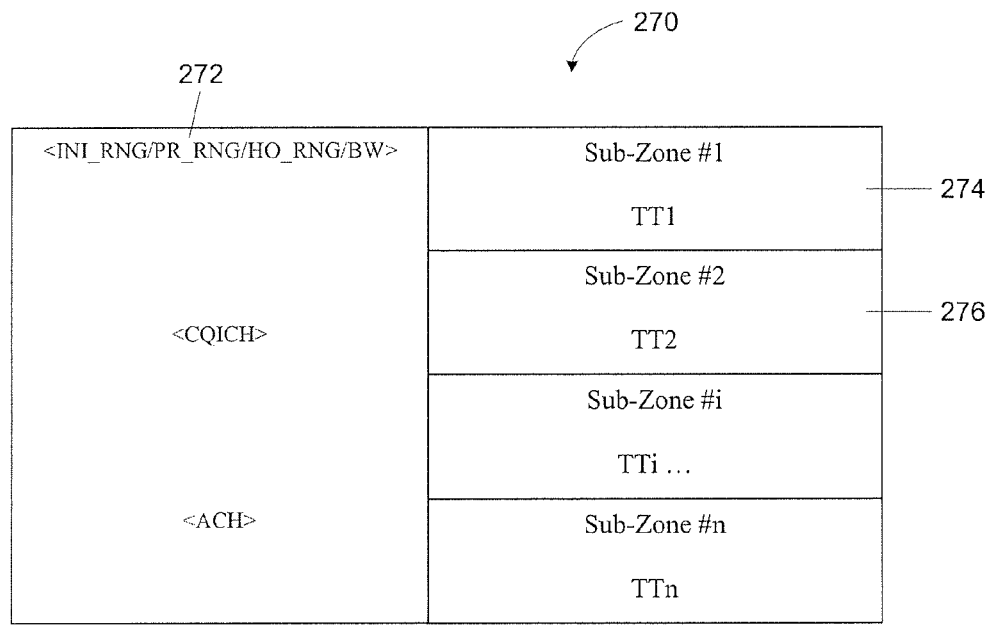
FIG. 11B illustrates an embodiment of a sub-zone allocation in an uplink sub-frame where each sub-zone in the sub-frame can have a different pilot sub-carrier density.

For the UL link, a similar concept can be applied for Tile structure. As illustrated in FIG. 11B, sub-frame 270 includes a preamble 272 and sub-zones using tile structures from Tile Type Set={TT1, TT2 ... TTn}, where TT1 274 could be defined as per the standard, as in, as per the reference Section 8.4.6.2.1 on the UL. Variations of tile types, e.g., TT2 276, can be defined to include more pilot sub-carriers and placing the pilot sub-carriers in different locations within the tile set similar to cluster types. In such a fashion, a certain number of tile type sets could be generated. Within the data portion of the frame, i.e., within the PUSC zone, several sub-zones are defined. If a tile type set is pre-defined for each sub-zone (please see FIG. 11B), then depending on the channel environment MS bursts could be allocated to particular sub-zone that would be most pertinent for efficient channel estimation to take place.

Figure 12:
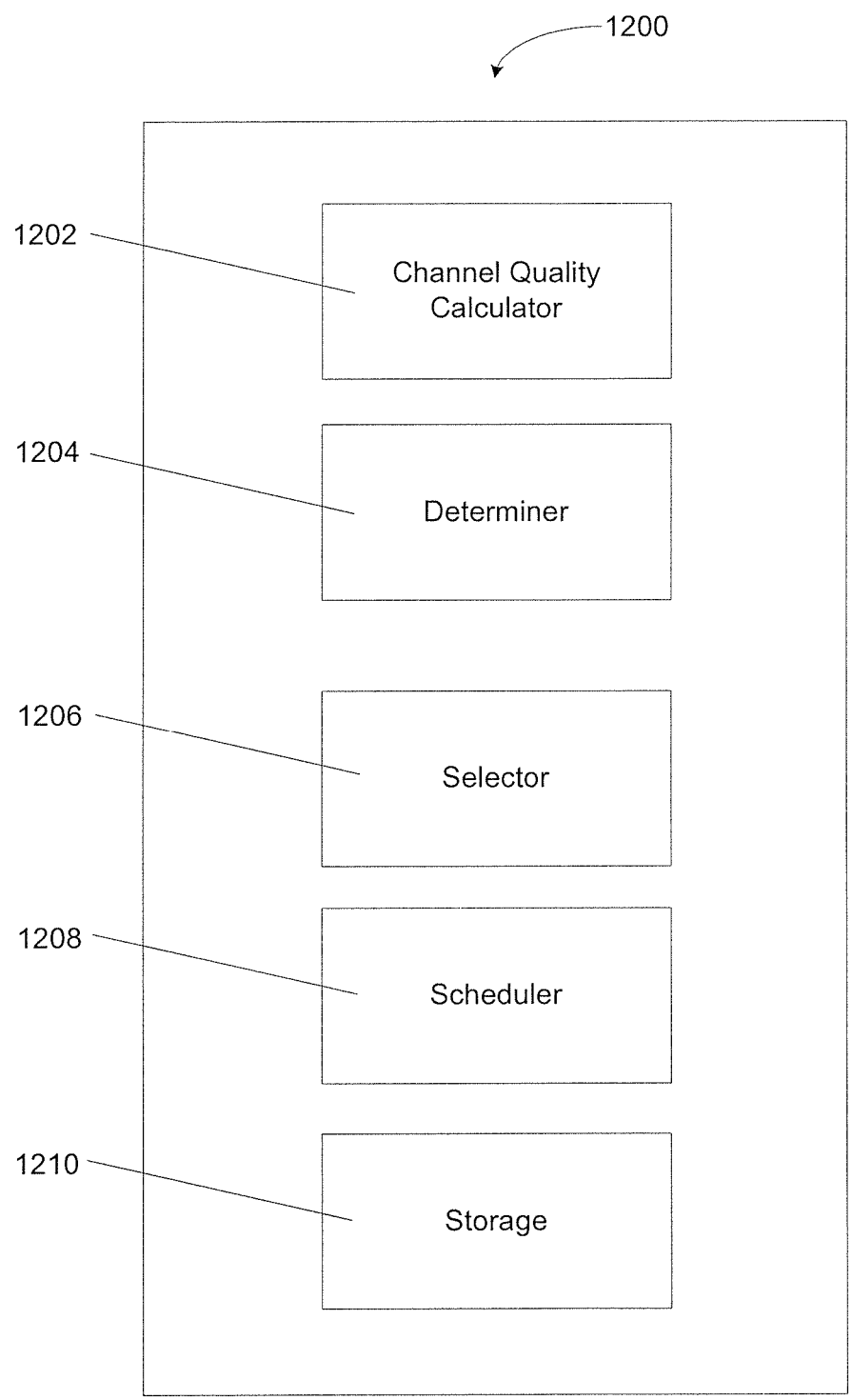
FIG. 12 illustrates an embodiment of a system for using sub-zones with varying pilot sub-carrier densities in OFDMA communications

FIG. 12 illustrates a system 1200 in accordance with one embodiment of the present invention. System 1200 includes a channel quality calculator 1202, a determiner 1204, an evaluator 1206, and a scheduler 1208. According to one embodiment, channel quality calculator 1202 can calculate channel quality from sub-carriers; determiner 1204 can determine whether the channel quality is outside a threshold range; selector 1206 can select a different pilot sub-carrier density for a sub-zone based on the value of the channel quality when the channel quality is outside a threshold range, if permitted; and scheduler 1208 can set the sub-zone to the different pilot sub-carrier density, if permitted. System 1200 can also include storage 1210. As a further embodiment, storage 1210 can be provisioned with a plurality of sub-carrier specification structures with different pilot sub-carrier densities.

In some embodiments, the selector 1206 may use a look-up table to select a different pilot sub-carrier density for a sub-zone based on the value of the channel quality. Alternatively or additionally, the selector 1206 may use a module for adjusting value of the channel quality by a mathematical function (e.g., subtraction, statistical functions), determining if the value of the channel quality is between a second threshold range, or both.

The various embodiments described above are provided by way of illustration only and should not be construed to limit the invention. Those skilled in the art will readily recognize the various modifications and changes which may be made to the present invention without strictly following the exemplary embodiments illustrated and described herein, and without departing from the true spirit and scope of the present invention, which is set forth in the following claims.

What is claimed is:

1. A method for varying pilot sub-carrier density in OFDMA communications comprising;
   calculating channel quality from sub-carriers;
   determining whether the channel quality is outside a threshold range;
   selecting a different pilot sub-carrier density for a sub-zone of an existing zone based on the value of the channel quality when the channel quality is outside the threshold range, a single type of sub-channel assignment protocol being used within the zone; and
   setting the sub-zone to the different pilot sub-carrier density.

2. The method of claim 1, wherein the different pilot sub-carrier density is lower than a pilot sub-carrier density in use by the sub-zone.

3. The method of claim 1, wherein the pilot sub-carrier locations maximize|PSInew-PSIe, where PSInew is a Pilot Sub-carrier Index for new pilot sub-carrier locations and PSIe is a Pilot Sub-Carrier Index for existing pilot sub-carrier locations.

4. The method of claim 1, wherein the selecting comprises selecting the minimal different pilot sub-carrier density resulting in the mean-squared error of a predicted channel estimation error being between a desired range.

5. The method of claim 1, wherein the OFDMA communications are performed by a multiple-input and multiple-output (MIMO) station.

6. The method of claim 1, wherein one or more steps of the method are implemented by a mobile station.

7. The method of claim 1, wherein one or more steps of the method are implemented by a base station.

8. The method of claim 1, further comprising determining that two or more mobile stations are substantially co-located.

9. The method of claim 1, wherein the channel quality comprises using one or more of channel condition, standard deviation of the channel condition, ACK/NACK, channel correlation, channel rank, or a combination thereof.

10. The method of claim 1, wherein the setting comprises instructing a base station and a mobile station to implement the sub-zone to the different pilot sub-carrier density.

11. The method of claim 1, wherein the OFDMA communications are LTE, fixed WiMAX, or mobile WiMAX compliant.

12. The method of claim 11, wherein the setting comprising:
    establishing a sub-carrier specification structure with the different pilot sub-carrier density, wherein the sub-carrier specification structure includes a cluster structure, a tile structure, or a zone structure; and using a sub-zone information element (IE) to implement the sub-carrier specification structure for the sub-zone.

13. The method of claim 11, wherein the sub-carrier specification structure with a different pilot sub-carrier density is implemented in one or more of Full Usage of SubChannels (FUSC), optional FUSC, Partial Usage of Sub-channels (PUSC), optional PUSC, Tile Usage of Sub-Channel 1 (TUSC 1), Tile Usage of Sub-Channel 1 (Tusc 2), and Adaptive Modulation and Coding (AMC) subzones.

14. The method of claim 1, wherein the setting comprises checking whether setting the sub-zone to the different pilot sub-carrier density is permitted.

15. The method of claim 14, wherein the checking comprises determining whether a system has sufficient resources to permit setting the sub-zone to the different pilot sub-carrier density.

16. The method of claim 14, wherein the checking comprises determining that a base station and a mobile station are adapted to implement the sub-zone to the different pilot sub-carrier density.

17. The method of claim 1, further comprising provisioning an OFDMA station with a plurality of sub-carrier specification structures with different pilot sub-carrier densities.

18. The method of claim 17, wherein the setting comprises using a pre-provisioned sub-zone having the different pilot density for the OFDMA communications.

19. A system for varying pilot sub-carrier density in OFDMA communications comprising:
    a channel quality calculator configured to calculate channel quality based on sub-carriers;
    a determiner configured to determine whether the channel quality is outside a threshold range;
    a selector configured to select a different pilot sub-carrier density for a sub-zone of an existing zone based on the value of the channel quality when the channel quality is outside the threshold range, a single type of sub-channel assignment protocol being used within the zone, and
    a scheduler configured to set the sub-zone to the different pilot subcarrier density.

20. The system of claim 19, wherein the different pilot sub-carrier density is lower than a pilot sub-carrier density in use by the sub-zone.

21. The system of claim 19, wherein the selector selects the minimal different pilot sub-carrier density resulting in the mean-squared error of a predicted channel estimation error being between a desired range.

22. The system of claim 19, wherein the system is implemented by a base station.

23. The system of claim 19, wherein the scheduler instructs a base station and a mobile station to implement the sub-zone to the different pilot sub-carrier density.

24. The system of claim 19, wherein the OFDMA communications are LTE, fixed WiMAX, or mobile WiMAX compliant.

25. The system of claim 19, further comprising a storage provisioned with a plurality of sub-carrier specification structures with different pilot sub-carrier densities.

26. The system of claim 25, wherein the scheduler establishes a sub-carrier specification structure with the different pilot sub-carrier density and transmits a sub-zone information.

27. The system of claim 19, wherein the selector determines whether a system has sufficient resources to permit setting the sub-zone to the different pilot sub-carrier density.

28. The system of claim 19, wherein the sub-carriers are pilot sub-carriers.

29. A machine-readable storage device in which software is recorded, wherein the software is configured to implement a method for varying pilot sub-carrier density in OFDMA communications comprising:
   calculating channel quality from sub-carriers;
   determining whether the channel quality is outside a threshold;
   selecting a different pilot sub-carrier density for a sub-zone of an existing zone based on the value of the channel quality when the channel quality is outside the threshold, a single type of sub-channel assignment protocol being used within the zone; and
   setting the sub-zone to the different pilot sub-carrier density.

* * * * *